United States Patent Office 3,544,623
Patented Dec. 1, 1970

3,544,623
3-ISOPROPYLTYROSINE
Holger V. Hansen, Morris Plains, and Robert I. Meltzer, Rockaway, N.J., assignors to Warner-Lambert Pharmaceutical Company, Morris Plains, N.J., a corporation of Delaware
No Drawing. Filed May 18, 1966, Ser. No. 550,918
Int. Cl. C07c *101/28*
U.S. Cl. 260—519      2 Claims

ABSTRACT OF THE DISCLOSURE 3-isopropyltyrosine and 3-isopropyl-α-alkyltyrosines of the formula:

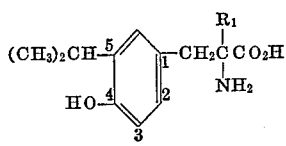

wherein $R_1$ is hydrogen or lower alkyl.
These compounds are useful as hypotensive agents.

---

This invention relates to compositions of matter and more particularly this invention relates to 3-isopropyltyrosine and 3-isopropyl-α-alkyltyrosines of the formula:

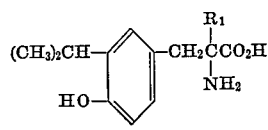

wherein $R_1$ represents hydrogen or a lower alkyl group such as methyl, ethyl, propyl, isopropyl, butyl, isobutyl and the like. This invention also includes within its scope novel processes for the production of the above compounds.

Also embraced within the scope of this invention are the pharmaceutically acceptable acid addition salts, the quaternary ammonium salts and alkali metal salts of the above compounds. The symbol $R_1$ as used hereinafter has the same meaning as defined.

In the description below, $R_2$ and $R_3$ also represent lower alkyl and $R_4$ represents hydrogen and lower alkyl in which lower alkyl has the same meaning as defined.

The novel compounds of this invention inhibit the action of the enzyme tyrosine hydroxylase which regulates the rate of production of sympathomimetic amines in the body. Thus the novel compounds of this invention are useful as hypotensive and sedative agents as well as being useful in the treatment of other diseases and ailments resulting from the production of excess amounts of sympathomimetic amines in the body.

In use, compounds of this invention are combined with an inert pharmaceutical diluent such as lactose to form dosage forms such as capsules or tablets or with deionized water to form solutions suitable for oral administration, the active ingredient being present in an amount of from about 10 to 1000 mg. per dosage unit. The dosage regimen may be adjusted according to individual requirements. For hypertension an oral dose of about 0.5 g. three or four times daily is preferred.

In addition, the compounds of this invention or their acid addition salts or their alkali metal salts or their quaternary ammonium salts may be combined with other known therapeutic agents, for example hypotensive agents such as the reserpine alkaloids, tranquilizers such as prazepam, chlordiazepoxide, diazepam and sedatives such as phenobarbital and diuretics such as chlorothiazide and the like to enhance and broaden their therapeutic spectrum.

According to our novel process the compounds of this invention may be produced by reacting a 2-isopropylphenol ether with zinc cyanide in the presence of hydrogen chloride and aluminum chloride to yield 3-isopropyl-4-alkoxybenzaldehyde. The aldehyde thus obtained is then reacted with hippuric acid in the presence of sodium bicarbonate which has been previously suspended in acetic anhydride. The resulting compound having the formula:

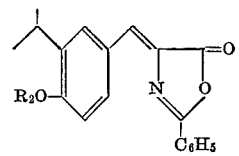

is then hydrolyzed in basis solution to yield 2-benzamido-3-(3-isopropyl-4-alkoxyphenyl)acrylic acid of the formula:

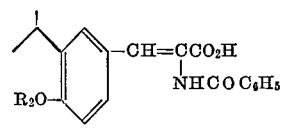

Hydrogenating compound III with gaseous hydrogen under pressure in the presence of a catalyst such as palladium on carbon or platinum oxide dissolved in glacial acetic acid yields 2-benzamido-3-(3-isopropyl-4-methoxyphenyl)propionic acid of the formula:

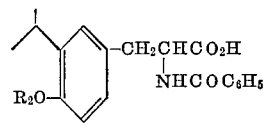

Treatment of compound IV with a strong mineral acid such as concentrated hydrochloric acid results in the production of 3-(3-isopropyl-4-alkoxyphenyl)alanine of the formula:

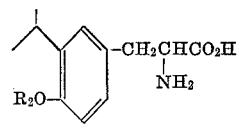

Finally, compound V is dealkylated by refluxing with a 48% solution of hydrobromic acid to yield the 3-isopropyltyrosine hydrobromide of this invention.

The foregoing reaction sequence may be represented by the following reaction scheme:

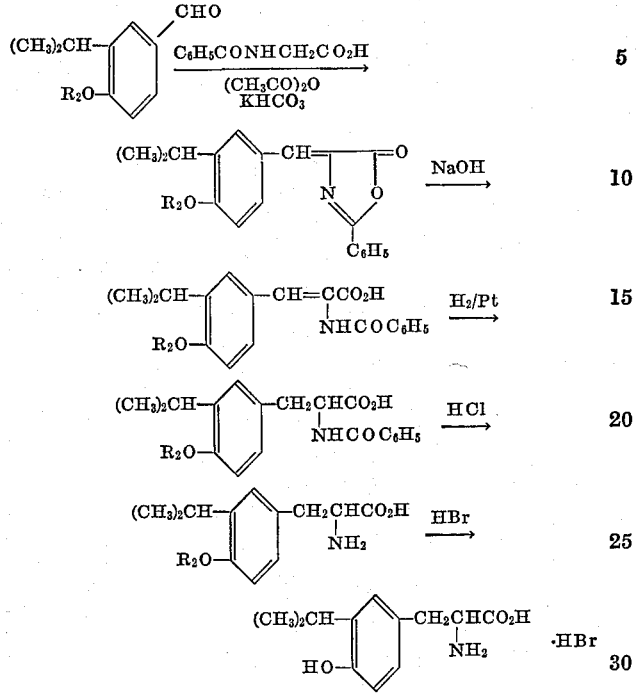

An alternative procedure for the production of compounds of this invention may be effected by treating 3-isopropyl-4-alkoxybenzaldehyde with a complex metal hydride such as potassium borohydride at ambient temperature such as from 20–30° C. in an alcoholic solution to yield 3-isopropyl-4-alkoxybenzyl alcohol of the formula:

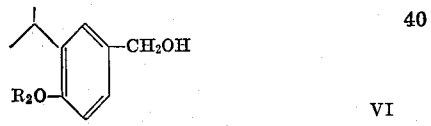

VI

The alcohol VI thus obtained may be converted to the corresponding nitrile of the Formula VII:

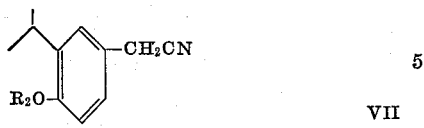

VII by halogenation with a reagent such as hydrogen chloride, phosphorous trichloride, phosphorous tribromide and the like and subsequent treatment of the resulting benzyl halide with an alkali metal cyanide. Compound VII is then converted into Compound VIII of the formula:

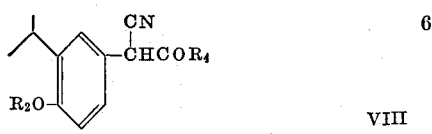

VIII with an alkyl ester of a lower carboxylic acid in the presence of an alkali metal alkoxide such as sodium ethoxide. Further treatment of VIII with hydrogen chloride yields a compound corresponding to the structure:

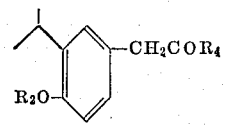

IX

Compound IX on treatment with an alkali metal cyanide such as potassium cyanide and ammonium carbonate yields a compound corresponding to the structure:

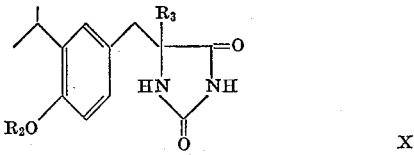

X and further treatment of Compound X with sodium hydroxide followed by treatment with hydrogen bromide yields 3-isopropyl-α-alkyl-tyrosine of this invention.

The foregoing reaction may be represented by the following schematic diagram:

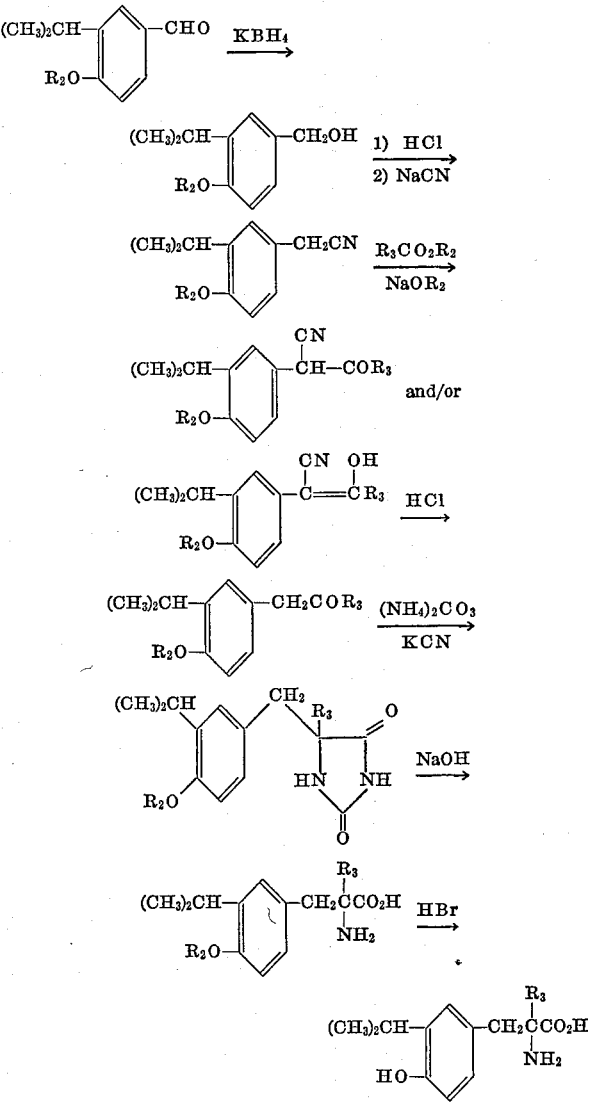

In the above chart, $R_2$ and $R_3$ represent lower alkyl groups.

It will be obvious to one skilled in the art that numerous variations in the above two alternate routes to the novel compounds of this invention as described can be envisioned, particularly alternate synthetic routes which have been used in the preparation of tyrosine and related amino acids substituted in the aromatic ring. See for example Steiner et al., Helv. Chem. Acta, 35, 2486 (1952); Dibbo et al., J.C.S. 1961, 2645; and Jorgensen et al., J. Pharm. Sci., 52, 122 (1962).

3-isopropyl-4-alkoxy benzaldehyde used as an intermediate was described by Gillman et al. in J.A.C.S. 57, 909 (1935). However, the process we employ to prepare said intermediate is entirely novel and this process will form a basis for a second patent application.

The compounds of this invention may be converted into their pharmaceutically acceptable nontoxic acid addition salts by conventional procedures. Exemplary of nontoxic acid addition salts are those formed with maleic, fumaric, succinic, tartaric, citric, malic, cinnamic, hydrochloric, hydrobromic, sulfuric, phosphoric and nitric acids. The acd addition salts may be prepared in the conventional manner, by treating a solution or suspension of the parent compound in an organic solvent with the desired acid, and then recovering the salt which forms by crystallization techniques. The alkali metal salts are prepared by treating a suspension of the parent compound in a solvent with an alkali such as sodium hydroxide. The quaternary ammonium salts may be prepared by treating the parent compound with an alkyl amine such as triethanolamine.

The following examples are included in order further to illustrate the invention. All temperatures are given in degrees centigrade.

PROCEDURE A

Example 1.—3-isopropyl-4-methoxybenzaldehyde

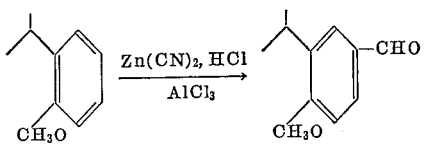

Hydrogen chloride is bubbled rapidly through a stirred cooled suspension of 200 g. (1.33 mole) of 2-isopropylanisole, 350 g. (2 moles) of zinc cyanide and 750 ml. of benzene for 1 hr. At this point, 275 g. (2.1 moles) of aluminum chloride and 200 ml. of benzene is added, and the mixture is heated slowly to 70°, while hydrogen chloride is slowly bubbled through the mixture, and held at this temperature for 1.5 hr. The mixture is cooled and poured onto 2 l. of ice and 250 ml. of concentrated hydrogen chloride. The resulting mixture is refluxed for 30 min. to break up the complex, cooled and separated. The aqueous layer is then extracted thoroughly with ether, the combined organic phases are dried (sodium sulfate) and evaporated and the resulting viscous red mass is extracted thoroughly with petroleum ether. Evaporation of the petroleum ether solution left the crude aldehyde, which, on distillation gives 192.8 g. (81%) of 3-isopropyl-4-methoxybenzaldehyde, B.P. 95°/0.45 mm., $n_D^{24}$ 1.5483. Redistillation furnishes an analytical sample with identical physical constants; $\lambda_{max}^{EtOH}$ m$\mu$ ($\epsilon$) 222 (13,900), 279 (12,750); $\gamma_{film}$ 2700 (aldehyde CH), 1690 (C=O) cm.$^{-1}$.

*Analysis.*—Calc'd for $C_{11}H_{14}O_2$ (percent): C, 74.13; H, 7.92. Found (percent): C, 74.15; H, 7.64.

The 2,4-dinitrophenylhydrazone derivative of this aldehyde is prepared in the usual way and recrystallized from ethanol-ethyl acetate, M.P. 222.5–3.5°.

*Analysis.*—Calc'd for $C_{17}H_{18}N_4O_5$ (percent): C, 56.98; H, 5.06; N, 15.64. Found (percent): C, 56.99; H, 4.98; N, 15.63.

Oxidation of the aldehyde with silver oxide in aqueous ethanol gives 3-isopropyl-4-methoxybenzoic acid, M.P. 165–6.5°.

Example 2.—4-(3-isopropyl-4-methoxybenzylidene)-2-phenyloxazol-5-one

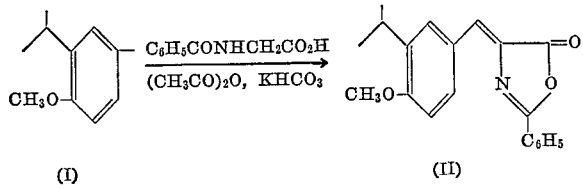

A slurry of 20 g. (0.11 mole) of 3-isopropyl-4-methoxybenzaldehyde (I), 20 g. (0.11 mole) of hippuric acid, and 12 g. (0.12 mole) of potassium bicarbonate in 50 ml. of acetic anhydride is stirred overnight without external heating. The resulting yellow mass is then treated with 100 ml. of boiling water and filtered after the decomposition of the anhydride is complete, giving the crude azlactone (II). This is recrystallized from 2-propanol to furnish 20.4 g. (57%) of (II) as bright yellow needles, M.P. 114–6°.

Recrystallization of a small sample from absolute ethanol gives an analytical sample of (II), M.P. 114.5–5.5°;

$\lambda_{max}^{EtOH}$ m$\mu$ ($\epsilon$) 256 sh. (15,300), 262 (16,400), 274 sh. (12,000), 392 (41,400); $\gamma_{max}^{Nujol}$ 1790, 1765 (C=O); 1650 (C=N) cm.$^{-1}$.

*Analysis.*—Calc'd for $C_{20}H_{19}NO_3$ (percent): C, 74.74; H, 5.96; N, 4.36. Found (percent): C, 74.78; H, 5.89; N, 4.51.

Example 3.—2-benzamido-3-(3-isopropyl-4-methoxyphenyl)acrylic acid

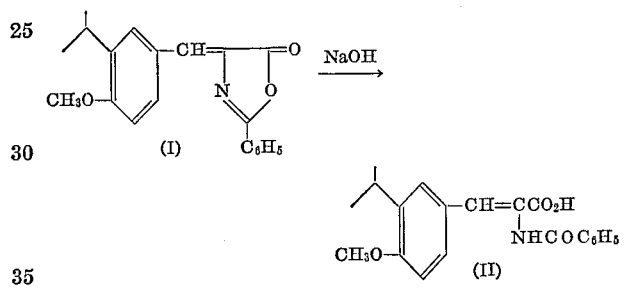

To a mixture of 275 ml. of ethanol and 200 ml. of aqueous 0.5 N potassium hydroxide is added 20 g. (0.062 moles) of 3-(3-isopropyl-4-methoxybenzylidene)-2-phenyloxazol-5-one (I). The mixture is heated on the steam bath for 1 hr. at 70° as the solid (I) slowly dissolves and the bright yellow color of the solution fades. An additional 5 ml. of 10 N potassium hydroxide is added and, after 10 min., the warm solution is poured over 1 l. of ice and 20 ml. of concentrated hydrochloric acid. The resulting white solid is filtered, washed well with water and air dried to give 21.5 g. (100%) of the crude cinnamic acid derivative (II), M.P. 225–7°. An analytical sample, from ethyl $\lambda_{max}^{EtOH}$ m$\mu$ ($\epsilon$) 229 (22,400), 312 (21,150); $\gamma_{max}^{Nujol}$ 3250, 2600 (OH), 1695 (acid C=O), 1695 (amlde C=O), 1630 (C=C) cm$^{-1}$.

*Analysis.*—Calc'd for $C_{20}H_{21}NO_4$ (percent): C, 70.78; H, 6.24; N, 4.13. Found (percent): C, 71.05, H, 6.41; N, 4.28.

Example 4.—2-benzamido-3-(3-isopropyl - 4 - methoxyphenyl)propionic acid

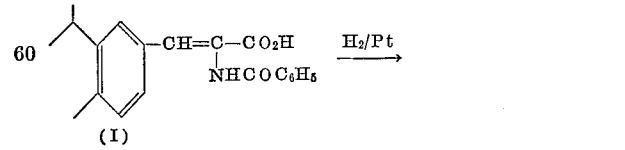

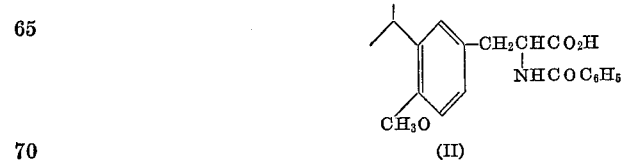

A mixture of 20 g. (0.06 mole) of 2-benzamido-3-(3-isopropyl-4-methoxyphenyl)acrylic acid (I), 300 ml. of glacial acetic acid and 0.5 g. of platinum oxide (10% palladium on carbon is also an effective catalyst) is hydrogenated overnight at room temperature at an initial hydrogen pressure of 51.5 p.s.i. gauge. During this period, the acrylic acid (I) gradually dissolves. The mixture is filtered, evaporated and the residual oil is warmed with 500 ml. of Skellysolve B to give the reduction product (II) as a white solid. Filtration gives 19.4 g. of crude II, M.P. 135–140°. This is purified by recrystallization from ethyl acetate-Skellysolve B to give 16.5 g. (82%) of pure 2-benzamido-3 - (3-isopropyl-4-methoxyphenyl)propionic acid (II), M.P. 146–147.50°. An analytical sample may be prepared by recrystallization from acetone-Skellysolve B, M.P. 148–50°;

$\lambda_{max.}^{EtOH}$ m$\mu$ ($\epsilon$) 227 (18,820), 275 (2860), 283 (2420); $\gamma_{max.}^{Nujol}$ 3270 (NH), 1720 (acid C=O), 1645 (amide C=O) cm.$^{-1}$.

*Analysis.*—Calc'd for $C_{20}H_{23}NO_4$ (percent): C, 70.36; H, 6.79; N, 4.10. Found (percent): C, 70.66; H. 6.84; N, 4.20.

Example 5.—3-(3-isopropyl-4-methoxyphenyl)alanine

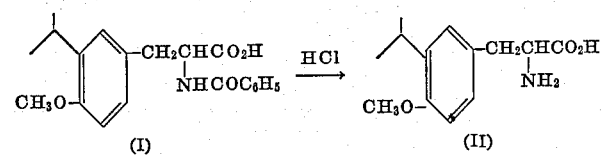

A solution of 30 g. (0.09 mole) of 2-benzamido-3-(3-isopropyl-4-methoxyphenyl)propionic acid (I), 150 ml. of concentrated hydrochloric acid and 150 ml. of acetic acid is refluxed overnight, then cooled and evaporated. Excess acid is removed by treating the residue with a small amount of water and evaporating again to dryness. The residue is taken up in 200 ml. of hot water, treated with charcoal and cooled. Filtration at this point gives 7.3 g. of benzoic acid, M.P. 118–122°. The filtrate is evaporated and the residue is taken up in 50 ml. of water and the pH of the resulting solution is adjusted to about 6.5 with an alkali, precipitating the free amino acid II. The slurry is aged at 100° for 1 hr., refrigerated overnight and filtered to give 14.8 g. (70%) of crude 3-(3-isopropyl-4-methoxyphenyl)alanine (II), M.P. 218–228°. Isoelectric precipitation, first from aqueous alkali, then from dilute acid (charcoal) furnishes 12.8 g. of the analytically pure amino acid (II), M.P. 225–7°);

$\lambda_{max.}^{0.1N\ NaOH}$ m$\mu$ ($\epsilon$) 225 (8590), 274 (1800), 282 sh. (1640); $\gamma_{max.}^{Nujol}$ 1610 (—CO$_2^-$), 2700 (NH$_3^-$) cm.$^{-1}$.

*Analysis.*—Calc'd for $C_{13}H_{19}NO_3$ (percent): C, 65.80; H, 8.07; N, 5.90. Found (percent): C, 65.90; H, 8.12; N, 6.17.

Example 6.—3-isopropyltyrosine hydrobromide

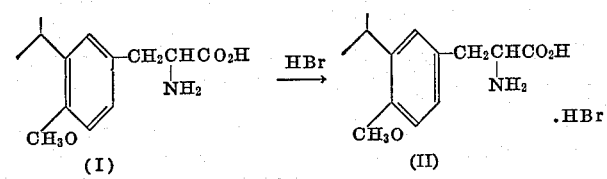

A mixture of 12 g. (0.05 mole) of the 0-methyl amino acid I, and 150 ml. of 48% hydrobromic acid is refluxed for 12 hr. The initially formed salt of I dissolves slowly near the boil point. The cooled reaction mixture is evaporated to dryness in vacuo and the solid residue is taken up in a small volume of water and reevaporated. This latter procedure is repeated in order to remove excess acid. Finally, the residue is dissolved in water, treated with charcoal, filtered and evaporated, leaving a nearly colorless semisolid residue. This is triturated with ether and filtered to give 16.2 g. of the crude salt II, M.P. 117–142°. Two recrystallizations from 75 ml. of about 30% aqueous hydrobromic acid, followed by washing with ethyl acetate, gives 9.7 g. of solvated 3-isopropyltyrosine hydrobromide (II) as a white crystalline solid with M.P. 135–7°. On drying at 80°/0.5 mm, this material loses its crystal structure and furnishes 8.3 g. (54%) of the analytically pure anhydrous 3-isopropyltyrosine salt II, M.P. 175–80°, decomposes with sintering from 125°;

$\lambda_{max.}^{EtOH}$ m$\mu$ ($\epsilon$) 228 (7460), 278 (2250), 284 sh. (2050); $\lambda_{max.}^{0.1N\ NaOH}$ m$\mu$ ($\epsilon$) 243 (10,290), 295 (3400); $\gamma_{max.}^{Nujol}$ 3250 (OH), 2400–2650 (NH$_3^+$), 1720 (C=O) cm.$^{-1}$.

*Analysis.*—Calc'd for $C_{12}H_{17}NO_3 \cdot HBr$ (percent): C, 47.38; H. 5.96; N, 4.60; Br, 26.27. Found (percent): C, 47.10; H, 6.25; N, 4.36; Br, 26.20, 26.12.

PROCEDURE B

Example 1.—3-isopropyl-4-methoxybenzyl alcohol

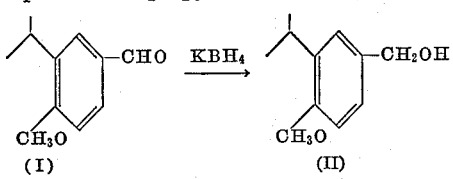

A stirred solution of 125 g. (0.7 mole) of 3-isopropyl-4-methoxybenzaldehyde (I) in 500 ml. of ethanol is cooled while a solution of 15 g. (0.4 mole) of potassium borohydride in 150 ml. of water is added slowly. The mixture is stirred at room temperature for 4 hr., then it is partially evaporated to remove ethanol. The residue is diluted with water and extracted with ether and the resulting ether solution, after drying with magnesium sulfate is evaporated.

The residue is distilled to give 114.6 g. (90%) of 3-isoprpyl-4-methoxybenzyl alcohol, B.P. 94–98°/0.2–0.3 mm, $n_D^{23}$ 1.5314;

$\lambda_{max.}^{EtOH}$ m$\mu$ ($\epsilon$) 226 (8,490), 275 (1,990), 281 sh. (1,720); $\gamma_{film}$ 3300 (OH) cm.$^{-1}$.

Example 2.—2-(3-isopropyl-4-methoxyphenyl) acetonitrile

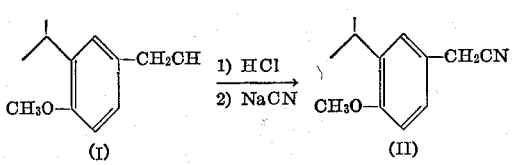

A solution of 86.5 g. (0.48 mole) of 3-isopropyl-4-methoxybenzyl alcohol (I) in 250 ml. of benzene is stirred while a stream of hydrogen chloride is passed into the liquid for 1 hr.; no attempt is made to control the temperature which rises rapidly during the initial phase of the reaction. The benzene solution is separated from the aqueous layer which forms, then it is washed sequentially with water, sodium bicarbonate and water, and dried with sodium sulfate. Evaporation leaves the corresponding benzyl chloride which is dissolved directly in 600 ml. of acetone and refluxed overnight with good stirring with a solution of 41.5 g. (0.85 mole) of sodium cyanide and 2.5 g. of sodium iodide in 100 ml. of water. After cooling, this mixture is evaporated and the residue extracted with 500 ml. of ether. The ether extract is dried with sodium sulfate and evaporated. The residue is distilled to give 80 g. (88%) of 2-(3-isopropyl-4-methoxyphenyl)acetonitrile, B.P. 108–118°/0.4–0.6 mm., $n_D^{23}$ 1.5183, as a yellow oil which is contaminated with traces of a waxy solid which codistills with the nitrile.

A similar preparation furnishes an analytical sample of this compound, B.P. 92–97°/0.1 mm., $n_D^{23}$ 1.5179, which did not contain solids.

$\lambda_{max.}^{EtOH}$ m$\mu$ ($\epsilon$) 226 (8,100), 275 (1,820), 282 (1,780); $\gamma_{film}$ 2250 (C$\equiv$N) cm.$^{-1}$

*Analysis.*—Calc'd for $C_{12}H_{15}NO$ (percent): C, 76.15; H, 7.99; N, 7.40. Found (percent): C, 76.31; H, 7.95; N, 7.55.

Example 3.—1-cyano-1-(3-isopropyl-4-methoxyphenyl)-2-propanone

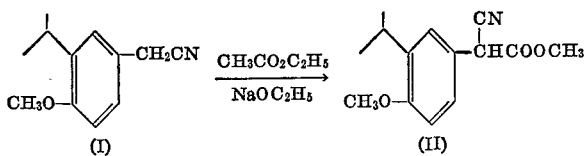

A solution of 65 g. (0.34 mole) of (3-isopropyl-4-methoxyphenyl)acetonitrile (I) in 110 g. (1.25 mole) of ethyl acetate is added during ½ hr. to a hot sodium ethoxide solution prepared from 24 g. (0.104 mole) of sodium and 275 ml. of absolute ethanol. The resulting mixture is refluxed for 4 hr., then allowed to stand overnight. The dark solution is poured over 750 ml. of ice and 75 ml. of glacial acetic acid. The resulting mixture is separated and the aqueous layer is extracted with ether. The combined organics are washed with brine, dried with sodium sulfate and evaporated, leaving the crude product (II) as a dark oil. This is triturated with petroleum ether and filtered to give 60.2 g. (76%) of crude α-cyanoketone (II), as a brown solid with M.P. 78–82°. Recrystallization from benzene-petroleum ether furnishes 52 g. (65%) of 1 - cyano - 1-(3-isopropyl-4-methoxyphenyl)-2-propanone (II), M.P. 90–92°, suitable for further reactions.

An analytical sample of this substance is prepared by dissolving a small sample in cold N alkali, extracting with ether, treating the aqueous enolate solution with charcoal and acidifying. The resulting solid is recrystallized twice from Skellysolve B, giving a somewhat unstable, colorless sample, M.P. 99–103°.

$\lambda_{max.}^{EtOH}$ 274 m$\mu$ ($\epsilon$ 15,640); $\gamma_{max.}^{Nujol}$ 3220, 2200 (conj. C≡N). 1640 (C=C) cm.$^{-1}$

*Analysis.*—Calc'd for $C_{14}H_{17}NO_2$ (percent): C, 72.70; H, 7.41; N, 6.06. Found (percent): C, 72.60; H, 7.54; N, 5.89.

Example 4.—1 - (3 - isopropyl - 4-methoxyphenyl)-2-propanone

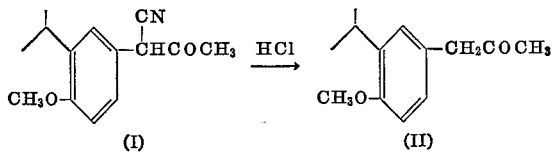

A solution of 15 g. (0.065 mole) of 1-cyano-1-(3-isopropyl - 4 - methoxyphenyl) - 2 - propanone (I) in 300 ml. of ether and 15 ml. of absolute ethanol is saturated with hydrogen chloride at 0° and stored at −10° for 48 hr. The resulting solution is evaporated and the residue is refluxed for 4 hr. with 150 ml. of concentrated hydrochloric acid. After cooling, the mixture is extracted with benzene and the benzene extracts are washed with water, dried with sodium sulfate and evaporated. Distillation gives pure 1 - (3 - isopropyl-4-methoxyphenyl)-2-propanone, B.P. 90–91°/0.07 mm., $n_D^{24}$ 1.5142, as a center fraction of 7.1 g. (53%).

$\lambda_{max.}^{EtOH}$ m$\mu$ ($\epsilon$) 226 (sh. 7200), 277 (2,350), 283 (sh. 2,150). $\gamma_{film}$ 1710 cm.$^{-1}$

*Analysis.*—Calc'd for $C_{13}H_{18}O_2$ (percent): C, 75.69; H, 8.80. Found (percent): C, 75.71; H, 8.82.

Example 5.—5 - (3 - isopropyl - 4 - methoxybenzyl)-5-methylhydantoin

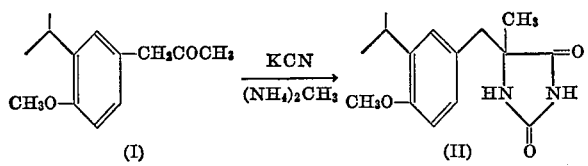

To a solution of 2.5 g. (0.0385 mole) of potassium cyanide and 25 g. (0.26 mole) of ammonium carbonate in 75 ml. of water is added a solution of 5 g. (0.025 mole) of 1 - (3 - isopropyl-4-methoxyphenyl)-2-propanone (I) in 75 ml. of ethanol. The resulting clear solution is stirred at 50–60° for 7 hr., then at room temperature for two days as a white solid gradually separates.

Most of the ethanol is then removed at reduced pressure and the remaining slurry filtered to give 6.85 g. of the crude hydantoin (II), M.P. 198–201°. Two recrystallizations from acetone-Skellysolve B furnishes an analytical sample of 5-(3-isopropyl-4-methoxybenzyl)-5-methylhydantoin, M.P. 203–204°.

$\lambda_{max.}^{EtOH}$ m$\mu$ ($\epsilon$) 226 (9,040), 275 (1,900), 282 (1,780); $\gamma_{max.}^{Nujol}$ 3150 (NH), 1765, 1720 (C=O) cm.$^{-1}$

*Analysis.*—Calc'd for $C_{15}H_{20}N_2O_3$ (percent): C, 65.19; H, 7.30; N, 10.14. Found (percent): C, 65.47; H, 7.39; N, 10.23.

Example 6.—3-isopropyl-α-methyltyrosine

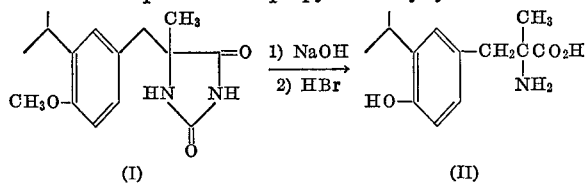

A slightly turbid solution of 8.3 g. (0.03 mole) of the hydantoin (I) is refluxed overnight in 100 ml. of 10% aqueous sodium hydroxide. After filtering through Supercel, the pH of the solution is adjusted to about 6 and the resulting slurry is warmed on the steam bath. After cooling, the mixture is filtered and the solid is washed with acetone to give 7.2 g. of crude product. This is dissolved in N hydrochloric acid, filtered from inorganics and the pH of the resulting solution adjusted to 6 with aqueous alkali; after ageing at 100° for 1 hr. and cooling, filtration gives 5.2 g. (68%) of crude 3-isopropyl-α-methyltyrosine methyl ether (II), M.P. 245–258° decomposes. An analytical sample of this intermediate, M.P. 269–272° decomposes, is obtained by repeated isoelectric precipitation.

*Analysis.*—Calc'd. for $C_{14}H_{21}NO_3$ (percent): C, 66.90; H, 8.42; N, 5.57. Found (percent): C, 66.53; H, 8.45; N, 5.48.

A solution of 5 g. (about 0.02 mole) of this crude methyl ether is refluxed overnight in 75 ml. of 48% hydrobromic acid. The resulting solution is cooled, evaporated to dryness and flushed twice with small volumes of water to remove excess acid. The residue is dissolved in 50 ml. of water, clarified and the pH adjusted to 5. The resulting slurry is aged at 100°, cooled and filtered, furnishing 4.6 g. (98%) of the tyrosine derivative (II), M.P. 272–276°. Isoelectric precipitation from basic and acidic solutions gives about 4.0 g. of the pure amino acid, M.P. 288–288.5° (decomposes). $\lambda$0.1 N NaOH m$\mu$ ($\epsilon$) 241 (10.830) and 294 (3,400).

$\gamma_{max}^{Nujol}$ 3230 (OH), 2500 (max+NH$_3$), 1630–2590 (CO$_2^-$) cm.$^{-1}$

*Analysis.*—Calc'd for $C_{13}H_{19}NO_3$ (percent): C, 65.80; H, 8.07; N, 5.90. Found (percent): C, 66.01; H, 8.34; N, 6.07.

It is understood that the foregoing detailed description is given merely by way of illustration and that many variations may be made therein without departing from the spirit of our invention.

Having described our invention, what we desire to secure by Letters Patent is:

1. A compound of the formula:

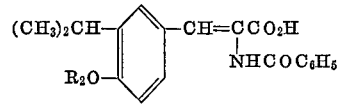

wherein $R_2$ is lower alkyl.

2. A compound of the formula:
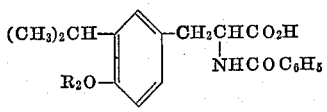
wherein $R_2$ is lower alkyl.
References Cited
UNITED STATES PATENTS
3,344,023  9/1967  Reinhold et al. _____ 260—519
LORRAINE A. WEINBERGER, Primary Examiner
L. A. THAXTON, Assistant Examiner
U.S. Cl. X.R.
260—307, 309.5, 465, 501.13, 590, 606, 613; 424—319